(12) United States Patent
Ruff et al.

(10) Patent No.: US 12,528,735 B2
(45) Date of Patent: Jan. 20, 2026

(54) VEHICLE WINDOW WITH AN IR-REFLECTIVE COATING WITH A DISCONTINUOUS METALLIC LAYER OF METAL NANOCRYSTALS

(71) Applicant: SAINT-GOBAIN GLASS FRANCE, Courbevoie (FR)

(72) Inventors: Julie Ruff, Aachen (DE); Sebastian Janzyk, Herzogenrath (DE); Jan Hagen, Bonn (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 59 days.

(21) Appl. No.: 18/548,561

(22) PCT Filed: Feb. 23, 2022

(86) PCT No.: PCT/EP2022/054520
§ 371 (c)(1),
(2) Date: Aug. 31, 2023

(87) PCT Pub. No.: WO2022/223179
PCT Pub. Date: Oct. 27, 2022

(65) Prior Publication Data
US 2024/0150232 A1   May 9, 2024

(30) Foreign Application Priority Data
Apr. 22, 2021   (EP) ..................................... 21169768

(51) Int. Cl.
*C03C 17/36* (2006.01)

(52) U.S. Cl.
CPC ...... *C03C 17/3626* (2013.01); *C03C 17/3639* (2013.01); *C03C 17/3642* (2013.01);
(Continued)

(58) Field of Classification Search
None
See application file for complete search history.

(56) References Cited

U.S. PATENT DOCUMENTS

| 4,910,088 | A | * | 3/1990 | Baudin ................. C03C 17/002 |
| | | | | 428/432 |
| 2007/0020465 | A1 | | 1/2007 | Thiel et al. |

(Continued)

FOREIGN PATENT DOCUMENTS

| CN | 103429549 A | 12/2013 |
| CN | 105307995 A | 2/2016 |

(Continued)

OTHER PUBLICATIONS

M. N. Polyanskiy, Refractiveindex.info database of optical constants. Sci. Data 11, 94 (Year: 2024).*

(Continued)

*Primary Examiner* — David Sample
(74) *Attorney, Agent, or Firm* — Pillsbury Winthrop Shaw Pittman LLP

(57) ABSTRACT

A vehicle window, includes at least one transparent glass pane and an IR-reflective coating on a surface of the glass pane, wherein the IR-reflective coating includes n metallic layers and (n+1) dielectric layer modules, wherein the layer modules are implemented as dielectric layers or layer sequences and wherein the layer modules and the metallic layers are arranged alternatingly such that each metallic layer is arranged between two layer modules, where n is a natural number greater than or equal to 1, wherein each metallic layer is implemented as a discontinuous layer of metal nanocrystals, which has regions that are occupied by metal nanocrystals and regions that are not occupied by nanocrystals. The uppermost layer module has a dielectric anti-reflection layer with a refractive index of at most 1.7.

22 Claims, 5 Drawing Sheets

Figure 1:
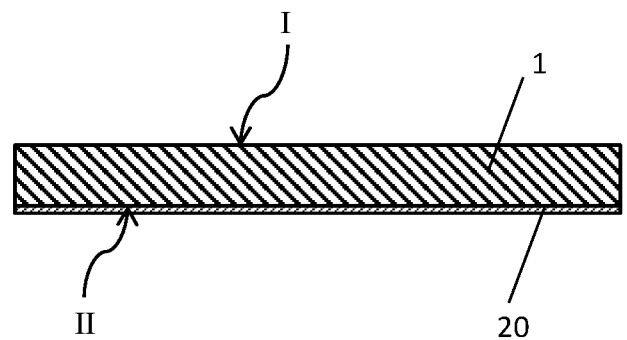

(52) U.S. Cl.
 CPC ...... *C03C 17/3655* (2013.01); *C03C 17/3657* (2013.01); *C03C 17/3668* (2013.01); *C03C 17/3681* (2013.01); *C03C 2217/281* (2013.01); *C03C 2217/42* (2013.01); *C03C 2218/156* (2013.01)

(56) References Cited

U.S. PATENT DOCUMENTS

| | | |
|---|---|---|
| 2007/0082219 A1 | 4/2007 | Fleury et al. |
| 2016/0223729 A1 | 8/2016 | Medwick et al. |
| 2018/0118614 A1 | 5/2018 | Polcyn et al. |
| 2019/0276353 A1 | 9/2019 | Polcyn et al. |

FOREIGN PATENT DOCUMENTS

| | | |
|---|---|---|
| JP | 6788236 B1 | 11/2020 |
| WO | WO 03/024155 A2 | 3/2003 |
| WO | WO 2013/104438 A1 | 7/2013 |
| WO | WO 2013/104439 A1 | 7/2013 |
| WO | WO 2014/080141 A1 | 5/2014 |
| WO | WO 2015/177480 A1 | 11/2015 |
| WO | WO 2015/177481 A1 | 11/2015 |

OTHER PUBLICATIONS

International Search Report as issued in International Patent Application No. PCT/EP2022/054520, dated Jun. 3, 2022.
Sardana, S. K., et al., "Morphology and optical properties of sputter deposited silvernanoparticles on plain, textured and antireflection layer coatedtextured silicon," Applied Surface Science 347, (Year: 2015), pp. 651-656.
Asanithi, P., et al., "Growth of Silver Nanoparticles by DCMagnetron Sputtering," Journal of Nanomaterials, (Year: 2012), (Article ID 963609), pp. 1-9.
First Office Action as issued in Chinese Patent Application No. 202280000806.3, dated May 27, 2025.
Second Office Action as issued in Chinese Patent Application No. 202280000806.3, dated Aug. 15, 2025.
Zhenzhong, B., et al., "Engineering Glass Processing Technical Manual," pp. 284-286, China Building Materials Industry Press, Apr. 2014, 1st edition, (Year: 2014). (brief explanation of relevance can be found on p. 9 of the English translation of the text of the Second Chinese Office Action).

\* cited by examiner

VEHICLE WINDOW WITH AN IR-REFLECTIVE COATING WITH A DISCONTINUOUS METALLIC LAYER OF METAL NANOCRYSTALS

CROSS-REFERENCE TO RELATED APPLICATIONS

This application is the U.S. National Stage of PCT/EP2022/054520, filed Feb. 23, 2022, which in turn claims priority to European patent application number 21169768.5 filed Apr. 22, 2021. The content of these applications are incorporated herein by reference in their entireties.

The invention relates to a vehicle window with an IR-reflective coating, a method for its production, and its use.

It is known to provide vehicle windows with transparent IR-reflective coatings. The coatings can reduce the heating of the vehicle interior and thereby improve the thermal comfort in the vehicle. Such coatings typically contain continuous metallic layers, in particular based on silver. Reference is made, merely by way of example, to WO03/024155, US2007/0082219A1, US2007/0020465A1, WO2013/104438, or WO2013/104439.

Common coatings have a number of limitations. For example, silver layers are susceptible to corrosion such that direct contact of the coating with the surroundings of the vehicle window must be avoided in order to prevent corrosion by atmospheric oxygen. As a result, the coatings cannot be used on external, exposed surfaces of vehicle windows. Their use is limited to composite panes consisting of two glass panes joined to one another via a thermoplastic intermediate layer. The coatings must be arranged on an internal surface of the glass panes facing the intermediate layer. In addition, it is necessary to exclude a circumferential peripheral edge region from the coating such that the coating is, so to speak, encapsulated in the interior of the composite pane where it is protected against corrosion. Since an uncoated edge region results in a visible side edge of the coating, which is not very appealing aesthetically, the use of the coatings remains limited to those composite panes that are equipped with an opaque circumferential edge region, inside which the side edge of the coating can be hidden. Consequently, the use of the coatings is largely limited to windshields and roof panels, which are typically implemented as composite panes and have an opaque edge region, usually as a printed and baked black enamel.

The continuous metallic layers also are not transparent to electromagnetic radiation, as used as mobile radio or GPS signals, in particular high-frequency radiation. To ensure the transmission of this radiation, so-called data transmission or communication windows must be created, typically by introducing decoated lines using laser processing. On the one hand, this is technically complicated and, on the other, also reduces the appearance aesthetically.

In addition to coatings on a surface of a pane, coatings are also known that are applied to a carrier film (usually a PET film) and are arranged within the intermediate layer of a composite pane. However, this solution is associated with high costs, has low long-term stability, and is disadvantageous in terms of the most aesthetic appearance of the vehicle window possible.

US2016/223729A1 and US2019/276353A1 disclose IR-reflective coatings that have multiple metallic layers, wherein some of the metallic layers are implemented as continuous layers and others as discontinuous layers.

WO2014080141A1 discloses a glass pane with an IR-reflective coating that has a plurality of metallic silver layers as well as dielectric layers based on titanium oxide. Each metallic layer is discontinuous. The metallic silver layers and the dielectric layers are arranged alternatingly, with the bottom and the top layer of the coating being dielectric.

Other coatings with discontinuous layers are, for example, known from WO2015177479A1, WO2015177480A1, and WO2015177481A1.

JP6788236B1 discloses an IR-reflective coating that is transparent to high-frequency radiation. It includes continuous layers based on cesium, tungsten, and oxygen.

The object of the present invention is to provide a vehicle window having an improved IR-reflective coating. In particular, the coating should not be susceptible to corrosion such that it can be used with direct contact to the surroundings, should be permeable to high-frequency radiation, should be economical to produce, and should ensure an aesthetic appearance of the vehicle window.

The object of the present invention is accomplished according to the invention by a vehicle window in accordance with claim 1. Preferred embodiments are apparent from the subclaims.

According to the invention, all metallic layers of the IR-reflective coating are implemented as discontinuous layers of nanocrystals. The inventors have surprisingly found that such discontinuous layers are not susceptible to corrosion. Consequently, use of the coating with contact with the surrounding atmosphere is possible, i.e., on an exposed surface of the vehicle window or in the interior of a composite pane, wherein the coating can extend all the way to the pane edge and edge decoating can be dispensed with. Thus, the coating can also be used with composite panes that do not have an opaque edge region. In addition, the discontinuous metallic layers are intrinsically characterized by transparency to high-frequency radiation such that subsequent laser processing to create data transmission windows is unnecessary. Moreover, the coating can be produced by methods common in the art such that it can be produced economically by the glass manufacturer without expensive retooling of production lines. These are major advantages of the present invention.

The vehicle window according to the invention comprises at least one transparent glass pane and an IR-reflective coating. The glass pane has two surfaces (primary surface) and a peripheral edge face between the two surfaces. The IR-reflective coating is applied on one of the surfaces of the glass pane. The coating is preferably arranged over the entire surface of said surface such that the entire surface is covered by the coating without exception since no uncoated regions are necessary to prevent corrosion or as data transmission windows. This is advantageous in terms of aesthetic appearance and simple, economical production.

The purpose of the IR-reflective coating is to reduce the passage of infrared radiation components of solar radiation through the vehicle window. The thermal comfort in the interior of the vehicle is improved by the thus reduced heat or energy input. For this purpose, the coating has IR-reflective properties in the near or mid-infrared (IR) range. Strictly speaking, the IR-shielding effect can also be realized by absorption instead of reflection of the IR-radiation. In the context of the invention, the expression "IR-reflective coating" is, consequently, to be broadly interpreted as "IR-shielding coating" or "IR absorbing or reflecting coating". The terms "solar-shading coating" or "solar control coating" are also used for such coatings.

The IR-reflective coating is a thin-film coating, i.e., a layer sequence of thin individual layers, which can also be referred to as a thin-layer stack. It comprises n metallic layers and (n+1) dielectric layer modules, with the dielectric layer modules and the metallic layers arranged alternatingly such that each metallic layer is arranged between two dielectric layer modules. Here, the number n is a natural number greater than or equal to 1. Accordingly, the coating according to the invention comprises, starting from the surface of the glass pane, in the order indicated ("from bottom to top") at least:

a first dielectric layer module
a metallic layer
a second dielectric layer module.

Optionally, above that, one or more further layer pairs of the type a further metallic layer
a further dielectric layer module can be arranged.

The dielectric layer modules form the upper and lower end of the layer structure and separate adjacent metallic layers from one another if more than one metallic layer is present. The layer modules are implemented either as a single dielectric layer or as a dielectric layer sequence (i.e., two or more dielectric layers arranged atop one another). All dielectric layers of each layer module are preferably continuous layers without interruptions. "A continuous layer" is understood to be a substantially homogeneous layer that has no interruptions.

According to the invention, each metallic layer of the IR-reflective coating is implemented as a discontinuous layer of metal nanocrystals, in particular of silver nanocrystals. "A discontinuous layer" is understood to be such a layer that has interruptions, i.e., uncoated regions. The metallic layer thus has regions occupied by metal nanocrystals and regions that are not occupied by nanocrystals. The occupied regions can also be referred to as coated regions. The unoccupied regions can also be referred to as interruptions or uncoated regions. The occupied and unoccupied regions are, in particular, distributed irregularly, i.e., not in the form of a regular geometric pattern.

The above statements refer to the discontinuous metallic layer as such. In the IR-reflective coating, unoccupied regions described (i.e., regions not occupied by metal nanocrystals) do not, of course, remain as empty spaces, but are filled by the material of the dielectric layer situated directly above. The metallic layer according to the invention thus consists of discontinuously distributed regions, with said dielectric material identical to that of the dielectric layer situated directly above. In other words, each metallic layer is implemented as a discontinuous layer of metal nanocrystals that has regions that are occupied by metal nanocrystals as well as regions that are not occupied by nanocrystals, but are occupied by the material of the dielectric layer situated directly above.

Depending on the surface occupancy (occupancy density), the discontinuous layer can be formed in different ways:

Borderline case of low surface occupancy: In the case of low surface occupancy, there are isolated occupied regions that are separated from one another by unoccupied regions. Each occupied region is thus completely surrounded by an unoccupied region. The unoccupied regions then form a connected network that surrounds the occupied regions, so to speak, as "islands" of nanocrystals. Strictly speaking, there is thus a single connected unoccupied region. The individual occupied regions can, in each case, be occupied by a single nanocrystal or an agglomerate of multiple nanocrystals. Also conceivable is the case in which some occupied regions are occupied with one single nanocrystal in each case and other occupied regions are occupied by an agglomerate of multiple nanocrystals.

Borderline case of high surface occupancy: In the case of high surface occupancy, there are isolated unoccupied regions that are separated from one another by occupied regions. Each unoccupied region is thus completely surrounded by an occupied region. The occupied regions then form a connected network of agglomerated nanocrystals that surrounds the unoccupied regions, so to speak, as "islands" of empty spaces. Strictly speaking, there is thus a single connected occupied region.

Any combinations of these two limit cases are possible. For example, the following configurations can occur:

The discontinuous coating is formed according to the limit case of high surface occupancy, wherein, additionally, within at least some of the isolated unoccupied regions, one or more further occupied regions (single nanocrystals or agglomerates of nanocrystals) are arranged, that are completely surrounded by said unoccupied region.

The discontinuous coating has regions in accordance with the limit case of high surface occupancy and regions in accordance with the limit case of low surface occupancy.

There are multiple large regions separated from one another that are formed, in each case, in accordance with the limit case of high surface occupancy, i.e., as a connected network of agglomerated nanocrystals that surround the unoccupied regions, so to speak, as "islands" of empty spaces. These large regions are, in turn, completely surrounded by unoccupied large regions, which, for their part, form a connected network. Even within these unoccupied large regions, of course, individual isolated occupied regions (single nanocrystals or agglomerates of nanocrystals) can additionally be arranged.

Numerous tests were carried out with different surface occupancies and the two limit cases were observed experimentally by scanning electron microscopy. In all cases, the advantageous corrosion-stable properties of the discontinuous coating occurred. This was surprising for the inventors and the cause could not be fully explained. According to one explanation of the invention, the interruptions (unoccupied regions) of the discontinuous metallic layer resulted in the fact that corrosion starting from the edge cannot continue indefinitely, but is stopped. This could indicate that even when high surface occupancy was observed by scanning electron microscopy, microscopically small, not directly observable interruptions of the network of nanocrystals nevertheless occur, which are sufficient to stop the advancing corrosion. Corrosion always starts from the edge since the metallic layer is protected from above at least by the upper dielectric layer module.

The surface share of the occupied regions in the entire surface can be expressed as a surface occupancy percentage. The surface occupancy is typically in the range from 10% (limit case of low surface occupancy) to 90% (limit case of high surface occupancy). In a particularly advantageous embodiment, the surface occupancy of the discontinuous metallic layers is from 50% to 80%, particularly preferably from 60% to 70%. In this range, the occupancy is, on the one hand, high enough to result in a particularly good IR-shielding effect, and, on the other hand, low enough to particularly effectively prevent corrosion and to ensure the transmission of high-frequency radiation.

Compared to continuous, homogeneous metallic layers, the discontinuous layer of nanocrystals according to the invention has fundamentally different electronic and optical properties. Compared to continuous metallic layers, whose optical and electronic properties are substantially determined by a conduction band according to the physical band model, nanocrystals are characterized by a higher surface-to-volume ratio and their optical properties are determined by so-called "plasmon resonance". Free electrons are collectively excited to plasma oscillations against the ion cores (plasmons). Surface waves develop with longitudinal electronic oscillations parallel to the surface of a nanocrystal (surface plasmons). The wavelength required for this depends primarily on the size of the nanocrystals. In principle, this opens up the advantageous possibility of specifically adjusting the optical properties of the vehicle window, in particular light absorption and light transmission, by a suitable selection of the size of the nanocrystals according to the requirements of the application. They have high light transmittance; and, in addition, as a result of the small size of the nanocrystals, only few or no disturbing scattering effects occur.

The invention can be implemented with nanocrystals of different metals. For example, gold, niobium, tungsten, copper, aluminum, or silver have particularly suitable properties. In a particularly advantageous embodiment, the metal nanocrystals according to the invention are silver nanocrystals. Silver nanocrystals are well researched and are already used for some technical applications, for example, for biomedical applications, as antibacterial agents, as catalysts, or as plasmon-based sensors. The absorption maximum of silver nanocrystals is approx. in the range from 395 nm to 515 nm, depending on their size. In addition, the discontinuous layers of silver nanoparticles are characterized by comparatively low transmittance in the near infrared range such that they are particularly suitable for IR-reflective coatings intended as sun-shading coatings in vehicle windows to reduce the heating of the vehicle interior.

The thickness of the metallic layer is preferably from 2 nm to 15 nm, particularly preferably from 2 nm to 10 nm, most particularly preferably from 3 nm to 8 nm. The maximum occurring thickness is referred to as the thickness of the discontinuous layer. In this thickness range, advantageous IR-shielding effects occur and the formation of nanocrystals is favored.

The discontinuous metallic layer of nanocrystals can be produced in various ways, with a basic distinction to be made between two different approaches:

Upstream production of the nanocrystals, which are then deposited on the surface of the glass pane: the nanocrystals can be generated in a solution by methods known per se, for example, by chemical reduction of metal ions or by laser ablation. The nanocrystals are stabilized by dissolved ligands, with the capability of influencing the size of the nanocrystals through the concentration of the ligands. Then, the nanocrystals are applied to the surface of the glass pane, for example, wet-chemically by applying the solution and then evaporating the solvent. Alternatively, the nanocrystals can also be produced by mechanical decomposition, wherein the metal is mechanically crushed (for example, using a ball mill) or ground until there are individual nanocrystals, and then applied to the surface.

Formation of the nanocrystals directly on the surface of the glass pane from metal atoms: here, individual metal atoms are deposited on the surface of the glass pane, which then migrate and form aggregates of atoms, which, in turn, grow into nanocrystals. In the case of higher surface occupancy, individual nanocrystals aggregate, in turn, to form nanocrystal agglomerates. Suitable for the deposition of the individual atoms are, in particular, vacuum-based methods such as physical vapor deposition (PVD), preferably cathodic sputtering ("sputtering"), particularly preferably magnetron-enhanced cathodic sputtering ("magnetron sputtering"). This variant is particularly advantageous because the same methods are typically also used to form conventional continuous layers. Thus, the glass manufacturer can simply integrate the production of the discontinuous layer into already existing processes and production lines.

It has been shown that the substrate has a significant influence on the formation of the discontinuous metal layer. This is particularly true in the case where atoms are deposited and the nanocrystals only form on the surface of the glass pane. The formation of homogeneous layers is particularly favored when the underlying layer has lattice spacing similar to or smaller than a crystal of the corresponding metal. In contrast, the formation of nanocrystals is favored when the underlying layer has larger lattice spacing than said metal. Preferably, therefore, the bottom layer module of the IR-reflective coating has a dielectric layer with lattice spacing greater than the lattice spacing of a crystal of the metal of the metallic layer. The lattice spacing of the dielectric layer is particularly preferably larger by at least 50 pm than the lattice spacing of the metal crystal. The lattice spacing of the dielectric layer is advantageously more than 410 pm, preferably more than 460 pm, particularly preferably more than 500 pm. The term "lattice spacing" refers to the (mean) distance between adjacent atomic cores in the crystal lattice. In the case of, for example, silver, the lattice spacing is about 408 pm. Said dielectric layer makes direct contact in particular with the metallic layer situated above it in order to bring about the advantageous substrate effect. In other words, said dielectric layer is arranged immediately below the metallic layer above it.

The migration behavior also depends on the roughness of the substrate, with the formation of local atomic aggregates and, starting from these, the formation of nanocrystals favored by a rougher substrate as opposed to the formation of a homogeneous, continuous atomic layer.

In an advantageous embodiment, the bottom layer module of the IR-reflective coating has a dielectric layer based on a nitride. Nitrides, in particular amorphous nitrides, often have larger lattice spacing than common metals and provide a rough substrate. Particularly good results are achieved with aluminum nitride (AlN; lattice spacing, about 498 pm) and silicon nitride ($Si_3N_4$; lattice spacing about 530 pm), with silicon nitride particularly preferred. In addition, mixed silicon-metal nitrides can be advantageously used, for example, mixed silicon-zirconium nitride (SiZrN). This is particularly true when the metallic layer is based on silver nanocrystals. The dielectric layer based on a nitride is particularly preferably in direct contact with the metallic layer situated above it, i.e., forms the uppermost layer of the layer module. In a particularly preferred embodiment, the bottom layer module consists exclusively of said dielectric layer based on a nitride and, furthermore, has no other layers. Such other layers are not required, and, as a result, the layer structure design is advantageously simple. The lattice spacing and the roughness of the nitride layer can also be influenced by the process conditions during deposition, for example, by high-pressure sputtering.

The thickness of said nitride-based dielectric layer of the lowest layer module is preferably from 15 nm to 40 nm, particularly preferably from 20 nm to 30 nm. In this range, advantageous roughness is achieved, diffusion of alkali ions from the glass pane into the metallic layer is prevented, and the layer is not damaged by cracks or the like during a downstream bending process, as is common in the case of vehicle windows.

If the IR-reflective coating has more than one metallic layer, the above statements regarding the lowest layer module preferably apply to all layer modules arranged below a metallic layer. Thus, these layers preferably have a layer based on a nitride (in particular silicon nitride), particularly preferably as the uppermost layer (such that the nitride layer makes direct contact with the metallic layer situated above it), most particularly preferably as the only layer. The thickness of the nitride layer is preferably from 15 nm to 40 nm, in particular from 20 nm to 30 nm.

Unless otherwise indicated, the specification of layer thicknesses refers to the geometric thickness of a layer. If instead the optical thickness, which is the product of the geometric thickness times the refractive index, is specified for characterization, this is indicated separately in each case. The values indicated for refractive indices are measured at a wavelength of 550 nm.

In the context of the invention, if a first layer is arranged "above" a second layer, this means that the first layer is arranged farther from the surface of the glass pane on which the coating is applied than the second layer. In the context of the invention, if a first layer is arranged "below" a second layer, this means that the second layer is arranged farther from the surface of the glass pane than the first layer. The bottom layer module is thus that layer module with the smallest distance from said surface, and the uppermost layer module is that layer module with the greatest distance from said surface. Likewise, the lowest layer of a layer module is that layer with the shortest distance from said surface, and the uppermost layer of a layer module is that layer with the greatest distance from said surface.

When a layer is based on a material, the layer consists for the most part of this material, in particular substantially of this material in addition to any impurities or dopants. The materials mentioned can be deposited stoichiometrically, substoichiometrically, or superstoichiometrically even though, here, for better understanding, stoichiometric molecular formulas are indicated. By means of dopants, for example, aluminum, zirconium, titanium, or boron, inherently dielectric materials can be provided with a certain electrical conductivity. The person skilled in the art will nevertheless identify them in terms of their function as dielectric layers, as is usual in the thin-film sector. The material of the dielectric layers preferably has electrical conductivity (reciprocal of the specific resistance) of less than 10-4 S/m.

According to the invention, the uppermost layer module has a dielectric anti-reflection layer with a refractive index of at most 1.7, preferably at most 1.6, for example, of 1.4 to 1.6, in particular about 1.5. Such an anti-reflection layer has anti-reflective properties such that the light transmittance of the IR-reflective coating is advantageously increased. In addition, it has been demonstrated that with such a layer, the color values of the coated pane are readily adjustable such that a desired color value can be advantageously realized, in particular by adjusting the layer thickness. The anti-reflection layer is preferably based on silicon oxide ($SiO_2$). Silicon oxide has a suitable refractive index and good anti-reflective properties and can be readily deposited with conventional coating methods, in particular cathodic sputtering.

The optical thickness of the anti-reflection layer is preferably from 30 nm to 120 nm, particularly preferably from 45 nm to 90 nm. Good anti-reflection properties are thus achieved. In the case of silicon oxide (refractive index about 1.5), this corresponds to a geometric thickness of 20 nm to 80 nm, preferably of 30 nm to 60 nm. Layers of this thickness can be readily deposited with conventional coating methods, in particular by cathodic sputtering at a reasonable line speed. With significantly thicker layers, the line speed must be reduced so much that the speed of the production process is adversely affected to a significant extent.

In an advantageous embodiment, a dielectric barrier layer is arranged below the dielectric anti-reflection layer of the uppermost layer module. The barrier layer is suitable and is intended to protect the underlying metallic layer or metallic layers against the influence of oxygen, on the one hand, during production of the vehicle window, in particular when there is a temperature treatment, for example, as part of a bending process, but also, on the other hand, in the finished product if the coating is situated on an exposed surface. The barrier layer preferably has a higher refractive index than the anti-reflection layer.

The barrier layer is preferably based on a nitride, particularly preferably based on silicon nitride. Alternatively, the barrier layer can, for example, be based on AlN, a mixed silicon-metal nitride such as SiZrN or tin oxide (SnO). The thickness of the barrier layer is preferably from 10 nm to 50 nm, particularly preferably from 20 nm to 40 nm. Good barrier properties are thus achieved, and the layer is not damaged during a downstream bending process.

Particularly preferably, the barrier layer is the only layer of the uppermost layer module below the anti-reflection layer.

In an advantageous embodiment, a dielectric cover layer is arranged above the dielectric anti-reflection layer of the uppermost layer module. The cover layer serves, on the one hand, to protect the underlying layers. On the other hand, the cover layer affects the visual appearance of the coating and, in particular, allows adjustment of the color of the coating by suitable choice of the material and the layer thickness. The cover layer preferably has a higher refractive index than the anti-reflection layer.

The cover layer is preferably based on a nitride, particularly preferably based on silicon nitride. Alternatively, the cover layer can, for example, be based on AlN, a mixed silicon-metal nitride such as SiZrN or SnO. The thickness of the barrier layer is preferably from 10 nm to 50 nm, particularly preferably from 20 nm to 40 nm. This allows appealing color settings to be achieved and the layer is not damaged during a downstream bending process. In the common L*a*b* color space, $-10 \leq a^* \leq 2$ and $-15 \leq b^* \leq 2$ should apply for the transmission color; $a^* \leq 0$, for the reflection color.

Particularly preferably, the cover layer is the only layer of the uppermost layer module above the anti-reflection layer.

The IR-reflective coating can optionally include at least one metallic blocking layer. The blocking layer can be part of a dielectric layer module, being arranged between two dielectric layers, or between a discontinuous metallic layer and the overlying and/or the underlying dielectric layer module, being in direct contact with said discontinuous metallic layer. Preferably, at least the uppermost dielectric layer module has a metallic blocking layer, or such a blocking layer is arranged between the uppermost dielectric layer module and the discontinuous metallic layer positioned directly under it. If the coating has more than one discontinuous metallic layer, each dielectric layer module that is arranged directly above a discontinuous metallic layer particularly preferably contains such a blocking layer or a blocking layer is arranged between each discontinuous metallic layer and the layer module positioned directly above it. The metallic blocking layer is preferably based on titanium, aluminum, or a nickel-chromium alloy. The thickness of the blocking layer is preferably less than or equal to 6 nm, for example, from 2 nm to 5 nm. The metallic blocking layers serve in particular to protect the underlying discontinuous metallic layers against oxidation. The blocking layer is a continuous layer.

One of the major advantages of the IR-reflective coating according to the invention is its corrosion resistance, as a result of which contact with the atmosphere need not be avoided. In a particularly advantageous embodiment, the IR-reflective coating is therefore in direct contact with the surroundings of the vehicle window, i.e., with the atmosphere surrounding the vehicle window. In particular, the at least one metallic layer is in contact with the environment. In particular, two variants are conceivable:

The coating is arranged on an external surface of the vehicle window exposed to the atmosphere. If the vehicle window is a single glass pane, this is one of its surfaces. If the vehicle window is a composite pane, i.e., the glass pane is joined to another pane via a thermoplastic intermediate layer verbunden, the coating is on the surface of the glass pane facing away from the intermediate layer.

The vehicle window is a composite pane, i.e., the glass pane is joined to another pane via a thermoplastic intermediate layer. The coating is arranged on the interior surface of the glass pane, i.e., facing intermediate layer. The coating extends all the way to the side edge of the composite pane; there is thus no uncoated peripheral edge region as is usual with conventional coatings. Likewise, a peripheral edge region of the coating is preferably not divided from the central region by a coating-free line (generated, for example, by laser processing), which can also be used to prevent corrosion with conventional coatings. Due to the absence of an uncoated edge region or a coating-free line in the edge region, the entire vehicle window can be used for through-vision since the edge region does not have to be masked. Consequently, the composite pane has, in a particularly advantageous embodiment, no opaque edge region, for example, formed by a masking print of a baked enamel or by an opaque edge section of the intermediate layer. The composite pane is most particularly preferably a side window, because such opaque edge regions are not provided in the case of side windows.

The IR-reflective coating is preferably arranged over the entire surface of the glass pane such that the entire surface of the glass pane is covered and has no regions that are not provided with the coating. With conventional metallic coatings, circumferential uncoated edge regions are common or edge regions separated from the central region by an uncoated line to prevent corrosion. Likewise, with conventional metallic coatings, so-called "data transmission windows" are common, typically in the form of a local patterning of the coating by uncoated linear regions introduced by laser processing. Due to the intrinsic corrosion-resistant and high-frequency radiation transparent properties of the discontinuous metallic layers according to the invention, such uncoated edge regions or decoated lines are unnecessary and, consequently, preferably not present.

In preferred embodiments, the IR-reflective coating according to the invention has exactly one discontinuous metallic layer (n=1) or exactly two discontinuous metallic layers (n=2). Thus, for all common applications, good results are achieved in terms of IR reflexion such that further metallic layers are not necessarily required. The fewer layers the coating comprises, the easier, faster, and more economical it is to produce.

The IR-reflective coating according to the invention comprises, in a preferred embodiment, exactly one discontinuous metallic layer, i.e., the number n is 1. The coating then comprises, starting from the surface of the glass pane, in the order indicated ("from bottom to top"):

the first/lower dielectric layer module
the metallic layer
the second/upper dielectric layer module.

Preferably, the coating consists of the layers mentioned. Since the IR-reflecting effect is limited with only a single metallic layer, this embodiment is particularly advantageous when the glass pane is made of tinted or colored glass, which, for its part, already partially absorbs the solar radiation (in particular portions in the near IR range). If the vehicle window is a composite pane, the glass pane can alternatively also be made of clear glass and the other pane and/or the thermoplastic intermediate layer can be tinted or colored.

The IR-reflective coating according to the invention comprises, in a preferred embodiment, exactly two discontinuous metallic layers, i.e., the number n is 2. The coating then comprises, starting from the surface of the glass pane, in the order indicated ("from bottom to top"):

a first/lowest dielectric layer module
the first metallic layer
a second/middle dielectric layer module
the second metallic layer
a third/top dielectric layer module.

Preferably, the coating consists of the layers mentioned. Since the IR-reflecting effect is increased by the two metallic layers, this embodiment is particularly advantageous when the glass pane is made of clear glass. If the vehicle window is a composite pane, the other pane and the thermoplastic intermediate layer are preferably also clear and neither tinted nor colored.

"Clear glass" means a glass pane that has an integrated light transmittance according to ISO 9050 of at least 90%. Tinted or colored glass panes have a lower integrated light transmittance.

The glass pane is preferably made of soda lime glass, which is common for window panes in the building sector and the automotive sector. However, in principle, it can also be made of other types of glass, for example, borosilicate glass, quartz glass, or aluminosilicate glass. The same applies to the other pane, if the vehicle window is a composite pane. The thickness of the glass pane can be freely selected according to the requirements of the application. Typically, the thickness is in the range from 0.5 mm to 10 mm, in particular from 1 mm to 5 mm.

The vehicle window is preferably curved in one or more spatial directions, as is customary for motor vehicle panes, with typical radii of curvature in the range of approx. 10 cm to approx. 40 m. However, the vehicle window can also be planar, for example, when it is intended as a pane for buses, trains, or tractors.

The invention also includes a method for producing a vehicle window, wherein a transparent glass pane is provided and an IR-reflective coating is applied on a surface of the glass pane. The IR-reflective coating comprises n metallic layers and (n+1) dielectric layer modules, where n is a natural number greater than or equal to 1. The layer modules are implemented as dielectric layers or layer sequences. The layer modules and the metallic layers are arranged alternatingly such that each metallic layer is arranged between layer modules. Each metallic layer is implemented as a discontinuous layer of metal nanocrystals, which has regions that are occupied by metal nanocrystals and regions that are not occupied by nanocrystals. The uppermost layer module is implemented such that it has a dielectric anti-reflection layer with a refractive index of at most 1.7.

The dielectric layer modules are preferably applied or deposited onto the pane surface by physical vapor deposition (PVD), particularly preferably by cathodic sputtering ("sputtering"), most particularly preferably by magnetron-enhanced cathodic sputtering ("magnetron sputtering"). However, in principle, the layer modules can also, for example, be applied by chemical vapor deposition (CVD), for example, plasma-enhanced chemical vapor deposition (PECVD), by vapor deposition, or by atomic layer deposition (ALD).

The metallic layers are also preferably applied or deposited onto the pane surface (or the underlying layer module) by physical vapor deposition (PVD), particularly preferably by cathodic sputtering ("sputtering"), most particularly preferably by magnetron-enhanced cathodic sputtering ("magnetron sputtering"). In this process, individual metal atoms are applied to the surface, which then migrate and combine to form aggregates and, finally, nanocrystals. Through suitable selection of process conditions, the formation of continuous thin layers can be prevented and the formation of nanocrystals can be favored. These include high-pressure and low deposition rate (low voltage). These effects are, in principle, known to the person skilled in the art, for example, from S. Sardana et al., *Applied Surface Science* 347 (2015) pp. 651-656 or P. Asanithi et al., *Journal of Nanomaterials* (2012) (Article ID 963609). The process conditions required in the individual case can be determined by the person skilled in the art by simple preliminary tests and/or simulations.

Alternatively, however, the nanocrystals can also, for example, be generated in solution and then deposited on the surface of the glass pane to form the discontinuous metallic layer, as already described above.

After application of the IR-reflective coating, the glass pane can be subjected to a bending process to bring it into a cylindrically or spherically curved shape, as is customary for vehicle windows, in particular for vehicle windows of passenger cars or trucks. For bending, the glass pane is softened by heating such that it becomes plastically formable and is then shaped by methods known per se, for example, gravity bending, press bending, and/or suction bending. Typical temperatures for glass bending processes are, for example, from 500° C. to 700° C.

If the vehicle window is intended to be implemented as a composite pane, the coated and curved glass pane is joined via a thermoplastic intermediate layer to another pane, in particular a glass pane. Known lamination methods are used here, for example, autoclave methods, vacuum bag methods, vacuum ring methods, calender methods, vacuum laminators, or combinations thereof. The bonding of the panes via the intermediate layer is usually carried out under the action of heat, vacuum, and/or pressure.

The invention further includes the use of a vehicle window according to the invention as a windowpane of a means of locomotion on land, on water, or in the air, in particular of an airplane or helicopter, a watercraft, a rail vehicle, or a motor vehicle, for example, a passenger car, a truck, a bus, or an agricultural or construction vehicle. The vehicle window can be used as a windshield, side window, rear window, or roof panel.

The vehicle window can be implemented as a monolithic single glass pane, in particular as a thermally toughened single glass pane (so-called "single pane safety glass", ESG). Such single glass panes are common in particular as side windows and rear windows.

The vehicle window is intended, in a window opening of a vehicle, to separate the interior from the external surroundings. A single glass pane has an exterior-side and an interior-side surface. In the context of the invention, "exterior-side surface" refers to that primary surface that is intended to face the external surroundings in the installed position. In the context of the invention, "interior-side surface" refers to that primary surface that is intended to face the interior in the installed position. In a preferred embodiment, the IR-reflective coating according to the invention is arranged on the interior-side surface of the single glass pane, where it particularly effectively reduces the energy input by solar radiation into the vehicle and is exposed to lower mechanical stresses than on the interior-side surface. In principle, however, it can also be arranged on the exterior-side surface.

Alternatively, the vehicle window can be implemented as a composite pane, wherein the coated glass pane is joined to another pane (in particular, a glass pane) via a thermoplastic intermediate layer (so-called "laminated safety glass", LSG). Such composite panes are common, in particular as windshields and roof panels, but increasingly also as side windows and rear windows.

The composite pane comprises an outer pane and an inner pane that are joined to one another via a thermoplastic intermediate layer. In the context of the invention, "inner pane" refers to the pane of the composite pane facing the vehicle interior. "Outer pane" refers to the pane facing the external surroundings. The outer pane and the inner pane have in each case an exterior-side surface and an interior-side surface. The interior-side surface of the outer pane and the exterior-side surface of the inner pane face one another and are joined to one another by the thermoplastic intermediate layer. The intermediate layer is formed by at least one ply of thermoplastic material. The intermediate layer can consist of this one ply of thermoplastic material and be formed, for example, from a single polymer film or a cast resin layer. However, the intermediate layer can also include multiple plies of thermoplastic material and, for example, be formed from multiple polymer films arranged flat atop one another. The at least one polymer film preferably contains ethylene vinyl acetate (EVA), polyvinyl butyral (PVB), or polyurethane (PU) or mixtures or copolymers or derivatives thereof, particularly preferably PVB. The thickness of the polymer film is preferably from 0.2 mm to 2 mm, particularly preferably from 0.3 mm to 1 mm.

The glass pane with the IR-reflective coating according to the invention can be used as the outer pane or as the inner pane of the composite pane, whereby the IR-reflective coating can be arranged on the exterior-side surface or the interior-side surface.

If the glass pane according to the invention is the outer pane, the coating is preferably arranged on the interior-side surface (facing the intermediate layer), since, on the exposed exterior-side surface, it is exposed to high mechanical and chemical stresses in use.

If the glass pane according to the invention is the inner pane, the coating is preferably arranged on the interior-side surface (facing away from the intermediate layer and exposed) or on the exterior-side surface (facing the intermediate layer).

Figure 2:
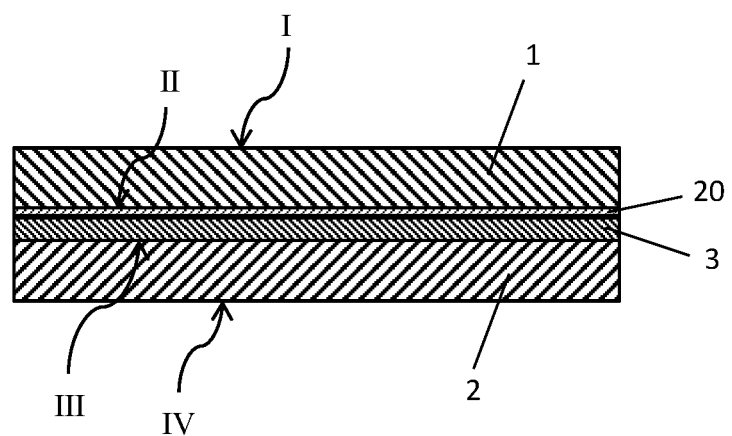
Figure 3:
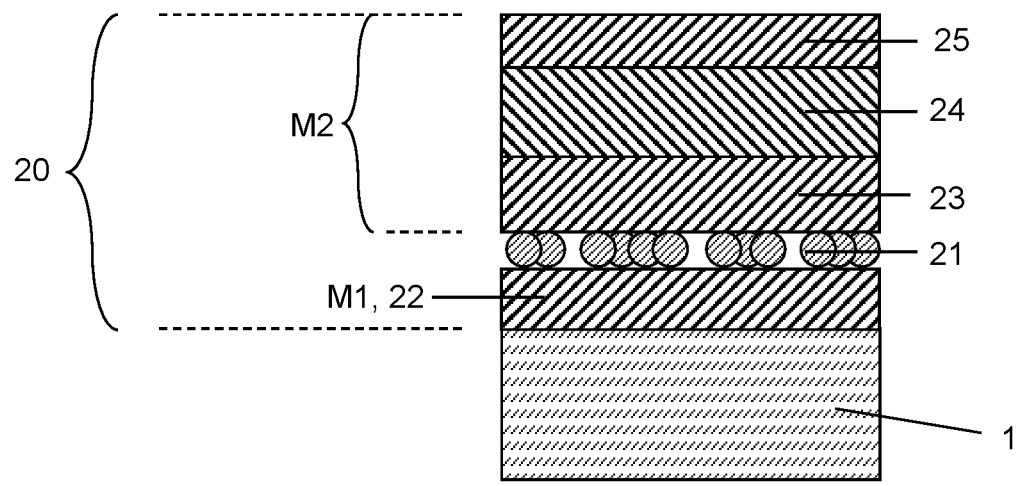
Figure 4:
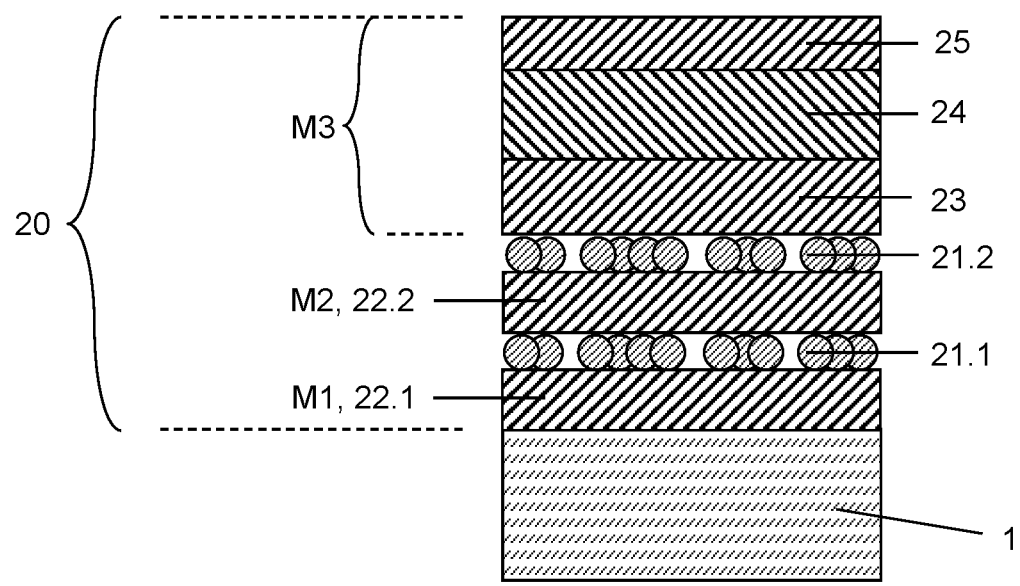
Figure 5:
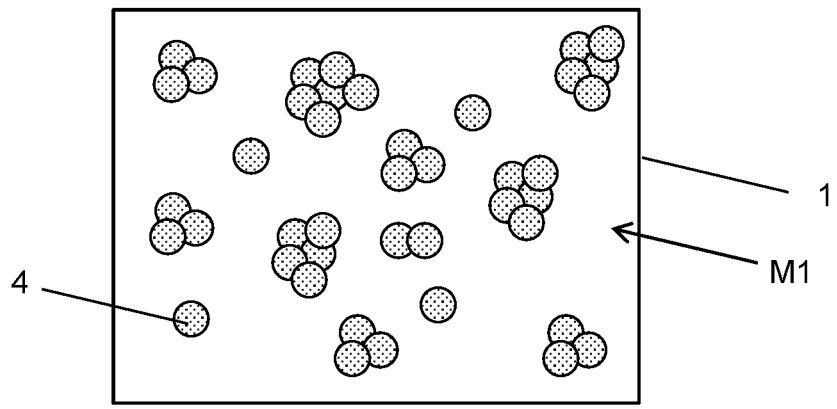
Figure 6:
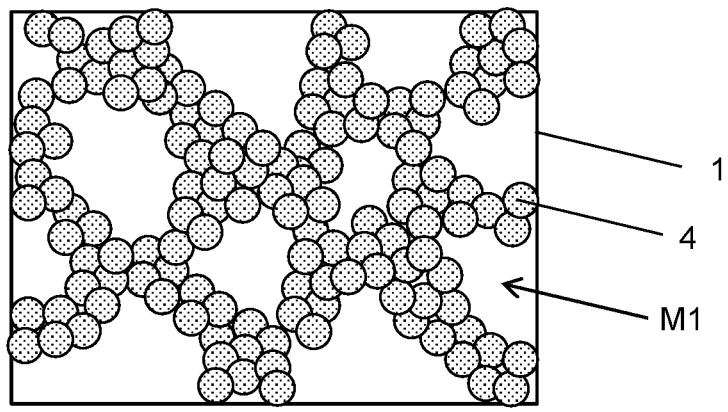
Figure 7:
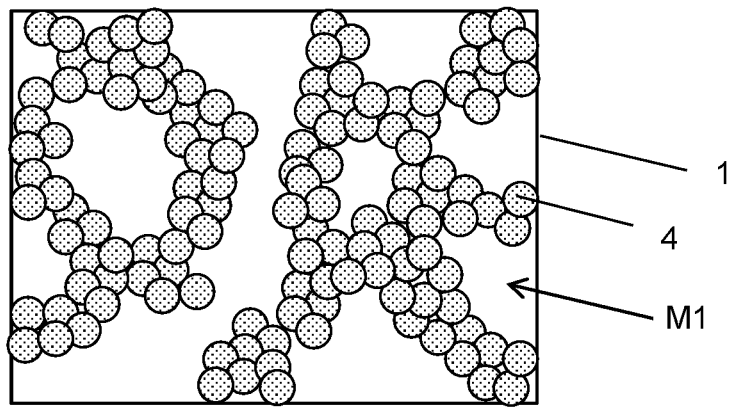
Figure 8:
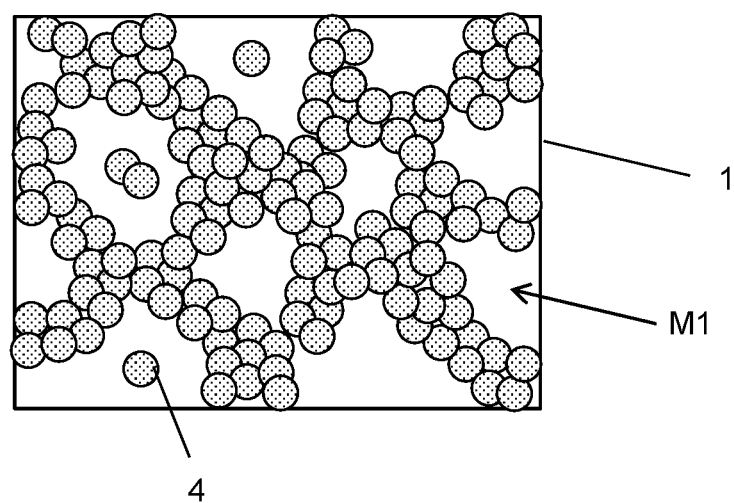
Figure 9:
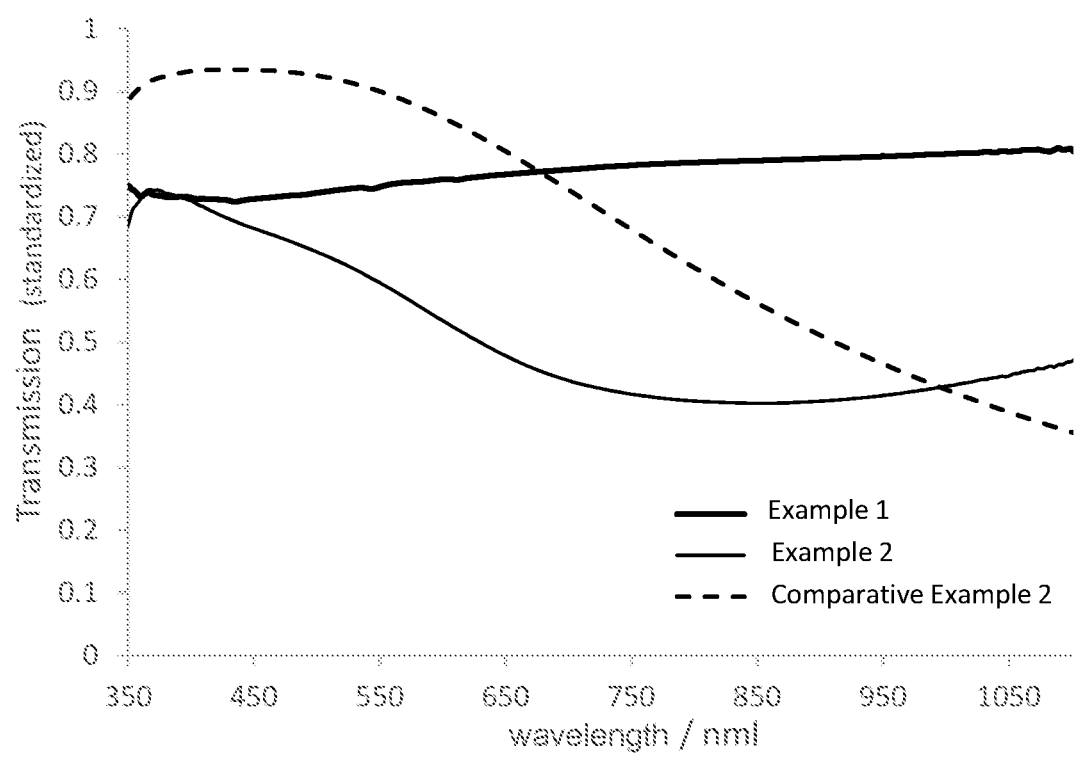
Figure 10:
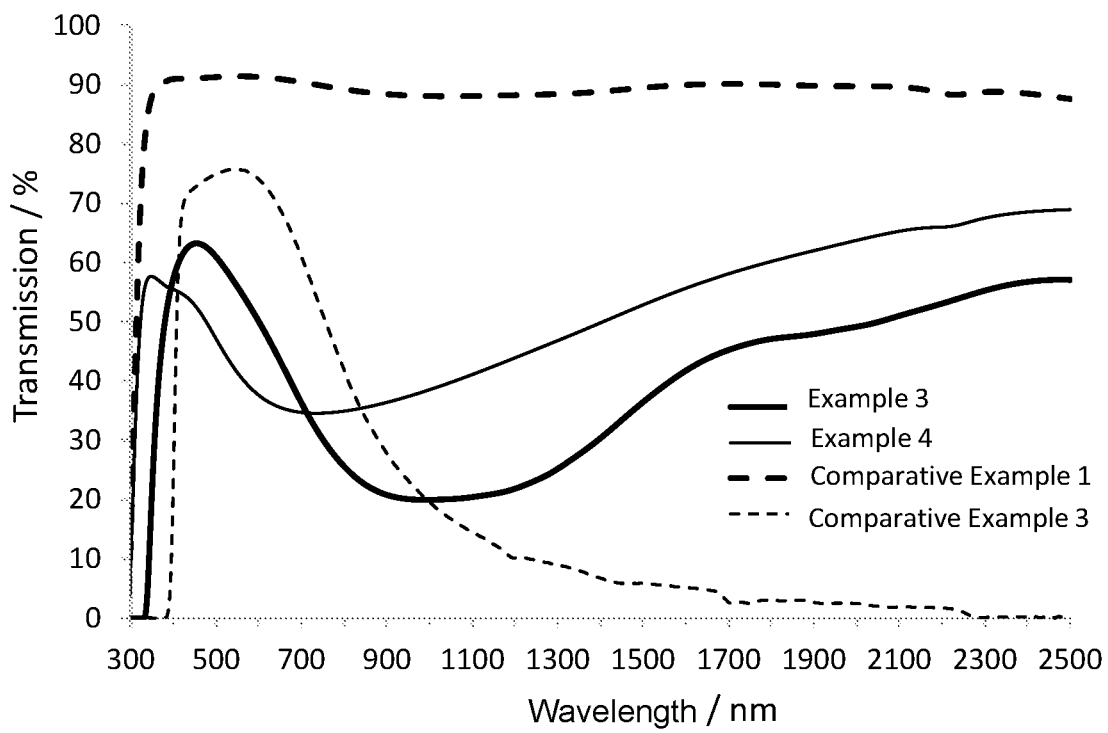
Figure 11:
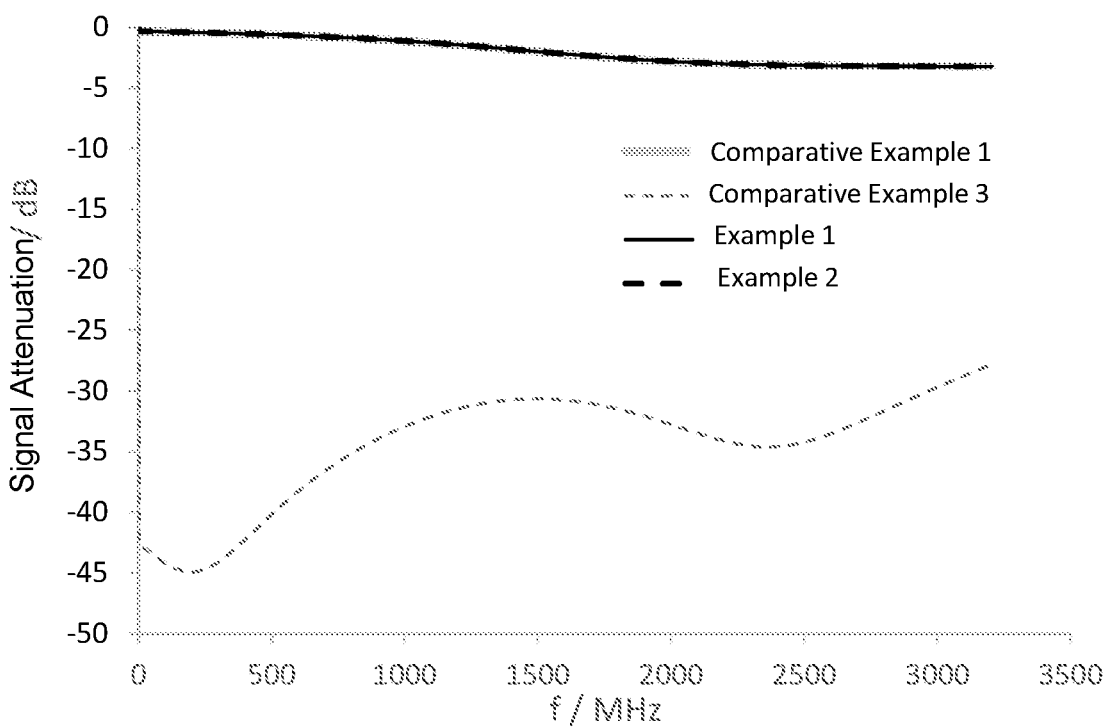

In the following, the invention is explained in greater detail with reference to drawings and exemplary embodiments. The drawings are a schematic representation and are not to scale. The drawings in no way restrict the invention. They depict:

FIG. 1 a cross-section through an embodiment of the vehicle window according to the invention, FIG. 2 a cross-section through a further embodiment of the vehicle window according to the invention, FIG. 3 a cross-section through an embodiment of the IR-reflective coating according to the invention on a glass pane, FIG. 4 a cross-section through a further embodiment of the IR-reflective coating according to the invention on a glass pane, FIG. 5 a plan view of an embodiment of the discontinuous metallic layer according to the invention on a glass pane, FIG. 6 a plan view of a further embodiment of the discontinuous metallic layer according to the invention on a glass pane, FIG. 7 a plan view of a further embodiment of the discontinuous metallic layer according to the invention on a glass pane, FIG. 8 a plan view of a further embodiment of the discontinuous metallic layer according to the invention on a glass pane, FIG. 9 an optical transmittance spectrum of two examples according to the invention and a comparative example, FIG. 10 an optical transmittance spectrum of two examples according to the invention and two comparative examples, FIG. 11 a spectrum of the high-frequency transmission of two examples according to the invention and two comparative examples.

FIG. 1 depicts an embodiment of a vehicle window according to the invention. The vehicle window is provided, by way of example, as a side window of a passenger car. It comprises a single glass pane 1 of thermally toughened soda lime glass with a thickness of 3.5 mm. The glass pane 1 has an exterior-side surface I, which faces the external surroundings, and an interior-side surface II, which faces the vehicle interior in the installed position. The interior-side surface II is completely provided with an IR-reflective coating 20 according to the invention.

Both surfaces I, II of such a single glass pane are exposed, i.e., have contact with the atmosphere. They could not be coated with conventional corrosion-susceptible IR-reflective coatings. Since the IR-reflective coating according to the invention is not susceptible to corrosion, such a coating is possible without any problems.

FIG. 2 depicts a further embodiment of a vehicle window according to the invention. The vehicle window is implemented as a composite pane, wherein a glass pane 1 is joined to another pane 2 via a thermoplastic intermediate layer 3. The glass pane 1 is provided as an outer pane that faces the external surroundings in the installed position. The other pane 2 is provided as an inner pane that faces the vehicle interior in the installed position. The glass pane 1 has an exterior-side surface I and an interior-side surface II. The other pane 2 also has an exterior-side surface III and an interior-side surface IV. The glass pane 1 and the other pane 2 are made, by way of example, of soda lime glass with a thickness of 2.1 mm. The thermoplastic intermediate layer 3 is, by way of example, formed from a film based on polyvinyl butyral (PVB) with a thickness of 0.76 mm. The vehicle window is provided, by way of example, as a side window of a passenger car.

The interior-side surface II of the glass pane 1 is completely provided with an IR-reflective coating 20 according to the invention. This coating 20 is in contact with the atmosphere at the side edges of the vehicle window. With conventional corrosion-susceptible IR-reflective coatings, it was necessary to provide an uncoated edge region to prevent this contact with the atmosphere. Since the side edge of the coating was thus visually conspicuous, it had to be provided in an opaque edge region of the vehicle window. Since side windows typically do not have such an opaque edge region, it was not readily possible to provide them with coatings.

The IR-reflective coating according to the invention is not susceptible to corrosion. An uncoated edge region that would have had to be hidden behind an opaque region is therefore unnecessary. Thus, even side windows can be provided with an IR-reflective coating according to the invention.

The configuration shown is to be understood merely as an example. Alternatively, the coated glass pane 1 according to the invention can also be used as the inner pane of the composite pane instead of as the outer pane. An exposed surface of the composite pane facing away from the intermediate layer 3 can also be provided with the IR-reflective coating 20, instead of a surface facing the intermediate layer 3.

FIG. 3 depicts an embodiment of the IR-reflective coating 20 according to the invention on a glass pane 1. The coating 20 consists of a first dielectric layer module M1 on the surface of the glass pane 1, a discontinuous metallic layer 21 on the first dielectric layer module M1, and a second dielectric layer module M2 on the metallic layer 21.

The first layer module M1 consists of a single dielectric layer 22 based on silicon nitride with a thickness of 20 nm. The layer 22 provides a rough substrate for the metallic layer 21 such that the formation of nanocrystals is favored.

The metallic layer 21 is a layer of silver nanocrystals. It includes occupied regions that are occupied by nanocrystals and unoccupied regions that are not occupied by nanocrystals. Merely for simplicity, the unoccupied regions are shown as gaps in the layer structure. In reality, these gaps are filled by the material of the overlying layer. The layer thickness of the metallic layer 21 is, for example, 5 nm.

The second layer module M2 consists of a dielectric layer sequence: a barrier layer 23 is applied to the metallic layer, an anti-reflection layer 24 above that, and a cover layer 25 above that. The barrier layer 23 is, for example, based on silicon nitride ($Si_3N_4$) with a thickness of 30 nm. It prevents oxidation of the underlying metallic layer 21, in particular during production of the coating by magnetron sputtering. The anti-reflection layer 24 is based on silicon oxide ($SiO_2$) with a thickness of 40 nm. It provides the coating 20 with an anti-reflection effect such that light transmittance is improved. The cover layer 25 is based on silicon nitride with a thickness of 15 nm. It allows adjustment of the color effect of the coating 20.

The layer structure shown and described corresponds to that of Example 3. It is to be understood merely as an example. Thus, it is equally possible for the second dielectric layer module M2 to include only a single layer, or for the first dielectric layer module M1 to include more than one layer.

FIG. 4 depicts an embodiment of the IR-reflective coating 20 according to the invention on a glass pane 1. The coating 20 consists of a first dielectric layer module M1 on the surface of the glass pane 1, a first discontinuous metallic layer 21.1 on the first dielectric layer module M1, a second dielectric layer module M2 on the first metallic layer 21.1, a second discontinuous metallic layer 21.2 on the second dielectric layer module M2, and a third dielectric layer module M3 on the second metallic layer 21.2.

The first layer module M1 and the second layer module M2 consist in each case of a single dielectric layer 22.1, 22.2 based on silicon nitride with a thickness of 20 nm. The layers 22.1, 22.2 provide a rough substrate for the metallic layer 21.1, 21.2 situated above in each case such that the formation of nanocrystals is favored.

The metallic layers 21.1, 21.2 are discontinuous layers of silver nanocrystals with a layer thickness of, for example, 5 nm in each case.

The third layer module M3 consists of a dielectric layer sequence: a barrier layer 23 is applied to the metallic layer 22.2, an anti-reflection layer 24 above that, and a cover layer 25 above that. The barrier layer 23 is, for example, based on silicon nitride with a thickness of 30 nm. The anti-reflection layer 24 is based on silicon oxide with a thickness of 40 nm. The cover layer 25 is based on silicon nitride with a thickness of 15 nm.

The layer structure shown and described corresponds to that of Example 4. It is also to be understood merely as an example.

FIG. 5 schematically depicts an embodiment of the metallic layer 21 of metal nanocrystals 4 according to the invention on a first dielectric layer module M1, which is, in turn, deposited on a glass pane 1. The embodiment represents the limit case of low surface occupancy. There are isolated regions that are occupied by nanocrystals 4. These regions are, in each case, occupied either by a single nanocrystal 4 or by an agglomerate of multiple nanocrystals 4. In addition, there is a connected unoccupied region without nanocrystals 4. This separates the isolated occupied regions from one another.

FIG. 6 schematically depicts a further embodiment of the metallic layer 21 of metal nanocrystals 4 according to the invention on a first dielectric layer module M1, which is, in turn, deposited on a glass pane 1. The embodiment represents the limit case of high surface occupancy. There is a connected region that is occupied by an agglomerate of nanocrystals 4. Within it, there are isolated unoccupied regions without nanocrystals 4 that are separated from one another by the occupied region.

Mixtures and variations of the limit cases of FIGS. 5 and 6 are also possible. For example, FIG. 7 schematically depicts a further embodiment of the metallic layer 21 of metal nanocrystals 4 according to the invention on a first dielectric layer module M1, which is, in turn, deposited on a glass pane 1. There are multiple large regions that are formed in each case according to the limit case of high surface occupancy with a connected region that is occupied by an agglomerate of nanocrystals 4, in which "islands" of unoccupied regions are formed. The large regions are, in turn, separated from one another by the unoccupied regions.

FIG. 8 schematically depicts a further embodiment of the metallic layer 21 of metal nanocrystals 4 according to the invention on a first dielectric layer module M1, which is, in turn, deposited on a glass pane 1. The embodiment is based on the limit case of high surface occupancy of FIG. 6. Within some of the unoccupied regions, there are, additionally, regions that are occupied by a single nanocrystal 4 or by an agglomerate of multiple nanocrystals 4.

EXAMPLES

Described below are observations that were made on a number of vehicle windows according to the invention. The vehicle windows were, in each case, formed as a single glass pane 1 of soda lime glass, which were provided with an IR-reflective coating 20 according to the invention. The layer sequences, materials, and layer thicknesses can be found in the following Tables 1 through 3. All layers were produced by magnetron sputtering. The formation of the nanocrystals was favored by suitable process conditions, in particular by high pressure and a low deposition rate.

TABLE 1

| Examples 1 and 2 | | | | |
|---|---|---|---|---|
| Reference Characters | 1 | M1, 22 | 21 | M2, 22 |
| Material | Glass (clear) | $Si_3N_4$ | Ag | $Si_3N_4$ |
| Layer Thickness | 2.1 mm | 30 nm | 4 nm | 30 nm |

Examples 1 and 2 differ in the surface occupancy of the silver (Ag) nanocrystals of the metallic layer 21. In Example 1, it was formed in accordance with the limit case of low surface occupancy in the form of "islands" of isolated occupied regions (cf. FIG. 5). In Example 2, it was formed (at least approx.) in accordance with the limit case of high surface occupancy as a connected occupied region with an agglomerate of nanoparticles, by which isolated "islands" of unoccupied regions were surrounded (cf. FIG. 5). The surface occupancy was characterized and assessed by scanning electron microscopy. "At least approx." means that the corrosion resistance may give rise to the suspicion that the agglomerate of nanoparticles had further interruptions and, consequently, there was no completely connected occupied region, even if these interruptions could not be observed microscopically.

TABLE 2

| Example 3 | | | |
|---|---|---|---|
| Reference Characters | | Material | Layer Thickness |
| M2 | 25 | $Si_3N_4$ | 15 nm |
| | 24 | $SiO_2$ | 40 nm |
| | 23 | $Si_3N_4$ | 30 nm |
| | 21 | Ag | 4 nm |
| M1 | 22 | $Si_3N_4$ | 20 nm |
| | 1 | Glass (tinted) | 2.1 mm |

The tinted glass had light transmittance of 80.5%.

TABLE 3

| Example 4 | | | |
|---|---|---|---|
| Reference Characters | | Material | Layer Thickness |
| M3 | 25 | $Si_3N_4$ | 15 nm |
| | 24 | $SiO_2$ | 40 nm |
| | 23 | $Si_3N_4$ | 30 nm |
| | 21.1 | Ag | 4 nm |

TABLE 3-continued

Example 4

| Reference Characters | | Material | Layer Thickness |
|---|---|---|---|
| M2 | 22.1 | Si$_3$N$_4$ | 20 nm |
| | 21.1 | Ag | 4 nm |
| M1 | 22.1 | Si$_3$N$_4$ | 20 nm |
| | 1 | Glass (clear) | 2.1 mm |

In Examples 3 and 4, the metallic layers were formed (at least approx.) in accordance with the limit case of high surface occupancy as a connected occupied region with an agglomerate of nanoparticles, by which isolated "islands" of unoccupied regions were surrounded (cf. FIG. 5).

The vehicle windows according to the invention of Examples 1 through 4 were compared with Comparative Examples.

Comparative Example 1 was a clear pane of soda lime glass with a thickness of 2.1 mm without a coating.

Comparative Example 2 was a clear pane of soda lime glass with a thickness of 2.1 mm, on which a coating of the type of Examples 1 and 2 was applied, wherein, however, the metallic layer niche was not formed from nanocrystals, but rather was applied as a continuous layer by means of magnetron sputtering. The layer sequence was:

Glass (clear) (2.1 mm)/Si$_3$N$_4$ (30 nm)/Ag (12 nm)/Si$_3$N$_4$ (30 nm)

Comparative Example 3 was a clear pane of soda lime glass with a thickness of XXX, with a more complex IR-reflective coating applied. Such coatings are common on conventional vehicle windows. The coating has two continuous metallic layers between dielectric layer modules. The layer sequence was:

Glass (clear) (2.1 mm)/Si$_3$N$_4$ (25 nm)/ZnO (10 nm)/NiCr (0.3 nm)/Ag (8 nm)/NiCr (0.3 nm)/ZnO (5 nm)/Si$_3$N$_4$ (10 nm)/SiZrN (15 nm)/Si$_3$N$_4$ (33 nm)/SiZrN (9 nm)/ZnO (6 nm)/NiCr (0.3 nm)/Ag (8 nm)/NiCr (0.3 nm)/ZnO (10 nm)/Si$_3$N$_4$ (20 nm)

Light Transmittance and Heat Input

FIG. 9 depicts transmittance spectra in the visible, near UV-, and near IR-range of the electromagnetic spectrum of Examples 1 and 2 and Comparative Example 2. In these cases, the coating had the same dielectric layer modules M1, M2, but differed in the design of the metallic layer 21 (Example 1: discontinuous in accordance with the limit case of low surface occupancy, Example 2: discontinuous in accordance with the limit case of high surface occupancy, Comparative Example 2: continuous). The spectra are normalized to 1, where 1 corresponds to transmittance of 100%. It can be seen that the transmittance spectra differ significantly not only quantitatively, but also qualitatively in terms of their profile. This can be used to verify the formation of a discontinuous layer, for example, in the context of preliminary tests for adjusting the process conditions for magnetron sputtering. With the continuous and significantly thicker silver layer of the Comparative Example 2, somewhat better shielding of IR-radiation is achieved than with the discontinuous, thinner silver layers. In Example 2, better shielding of IR-radiation than in Example 1 is again achieved, which is attributable to the higher surface occupancy with silver nanocrystals.

FIG. 10 depicts transmittance spectra in the visible, near UV, and near IR range of the electromagnetic spectrum of Example 3 and 4 and of Comparative Examples 1 and 3. Example 3 differs from Examples 1 and 2 by optimized layer modules M1, M2; Example 4 further differs by the presence of an additional discontinuous silver layer. In Example 3, a tinted glass pane 1 was used; in all other cases, a clear glass pane 1. It can be seen that both Examples according to the invention achieve significant shielding against IR-radiation, with transmittance being comparatively high in the visible spectral range.

Table 4 compares the TTS value, the light transmittance, and the light reflection of Examples 1 through 4 and of Comparative Examples 1 through 3. Here, RL stands for the integrated light reflection and TL for the integrated light transmittance (per ISO 9050, light source D65). The angle of incidence was 2°, the angle of observation 8°. TTS stands for the total transmittance of solar energy measured in accordance with ISO 13837, and is a measure of the heat input and, thus, the thermal comfort in the vehicle. The Examples according to the invention result in a significant reduction of the heat input compared to an uncoated glass pane (Comparative Example 1). The higher surface occupancy of Example 2 results in lower light transmittance compared to Example 1. With the optimized Examples 3 and 4, a very good TTS value that is comparable to that of Comparative Example 3 can be achieved. In the case of a tinted glass pane 1, this required an IR-reflective coating 20 with only one discontinuous silver layer (Example 3); in the case of a clear glass pane 1, an IR-reflective coating 20 with two discontinuous silver layers (Example 4).

TABLE 4

| | TTS/% | TL/% | RL/% |
|---|---|---|---|
| Example 1 | 78 | 75 | 23 |
| Example 2 | 63 | 56 | 16 |
| Example 3 | 54 | 53 | 3 |
| Example 4 | 55 | 41 | 4 |
| Comparative Example 1 | 90 | 91 | 8 |
| Comparative Example 2 | 63 | 87 | 9 |
| Comparative Example 3 | 52 | 74 | 9 |

Attenuation of High-Frequency Radiation

FIG. 11 depicts the attenuation behavior with respect to high-frequency radiation for Examples 1 and 2 and Comparative Examples 1 and 3. The Examples according to the invention exhibit behavior that is indistinguishable from an uncoated glass pane (Comparative Example 1). In contrast, the coating according to Comparative Example 3 with the continuous silver layers significantly attenuates the signal. Consequently, it is customary with such coatings to form so-called "data transmission windows by coating-free lines in order to enable transmission of, for example, antenna signals. This can be dispensed with in the case of the Examples with discontinuous silver layers according to the invention.

Corrosion Resistance

The corrosion behavior was investigated on Examples 1 and 2 and on Comparative Example 2. For this purpose, the specimens were heated and stored in a normal ambient atmosphere and their state of corrosion was determined by visual inspection. After 3 days, the continuous silver layer of the Comparative Example 2 was completely corroded through. In contrast, the Examples with the discontinuous silver layers according to the invention exhibited no signs of corrosion even after 60 days. The coatings according to the invention are thus even suitable for applications in which they have direct contact with the atmosphere (for example, on exposed surfaces or within a composite pane without an uncoated edge region).

LIST OF REFERENCE CHARACTERS (1) glass pane
(2) other pane
(3) thermoplastic intermediate layer
(4) nanocrystal
(20) electrically conductive coating
(21) discontinuous metallic layer
(21.1), (21.2) first, second discontinuous layer
(M1) first dielectric layer module
(M2) second dielectric layer module
(M3) third dielectric layer module
(22) dielectric layer
(22.1), (22.2) first, second dielectric layer
(23) dielectric blocking layer
(24) dielectric anti-reflection layer
(25) dielectric cover layer
(I) exterior-side surface of the glass pane 1
(II) interior-side surface of the glass pane 1
(III) exterior-side surface of the other pane 2
(IV) interior-side surface of the other pane 2

The invention claimed is:

1. A vehicle window, comprising at least one transparent glass pane and an IR-reflective coating on a surface of the at least one transparent glass pane,
   wherein the IR-reflective coating comprises n metallic layers and (n+1) dielectric layer modules, wherein the dielectric layer modules are implemented as dielectric layers or layer sequences and wherein the (n+1) dielectric layer modules and the n metallic layers are arranged alternatingly such that each metallic layer is arranged between two dielectric layer modules, wherein n is a natural number greater than or equal to 1,
   wherein each metallic layer is implemented as a discontinuous layer of metal nanocrystals, which has regions that are occupied by metal nanocrystals and regions that are not occupied by nanocrystals,
   wherein an uppermost dielectric layer module of the (n+1) dielectric layer modules has a dielectric anti-reflection layer with a refractive index of at most 1.7 and a dielectric cover layer above the dielectric anti-reflection layer, the dielectric cover layer forming an outermost layer of the IR-reflective coating.

2. The vehicle window according to claim 1, wherein a bottom dielectric layer module of the (n+1) dielectric layer modules has a dielectric layer with lattice spacing of more than 410 pm, which is in direct contact with the metallic layer situated above it.

3. The vehicle window according to claim 2, wherein the dielectric layer has a thickness of 15 nm to 40 nm.

4. The vehicle window according to claim 2, wherein the dielectric layer is based on a nitride.

5. The vehicle window according to claim 4, wherein the dielectric layer is based on silicon nitride, aluminum nitride, or mixed silicon-metal nitride.

6. The vehicle window according to claim 1, wherein the dielectric anti-reflection layer is based on silicon oxide.

7. The vehicle window according to claim 1, wherein the dielectric anti-reflection layer has an optical thickness of 30 nm to 120 nm.

8. The vehicle window according to claim 1, wherein the uppermost dielectric layer module has, below the dielectric anti-reflection layer, a dielectric barrier layer based on a nitride.

9. The vehicle window according to claim 8, wherein the uppermost dielectric layer module has, above the dielectric anti-reflection layer, said dielectric cover layer that is based on a nitride.

10. The vehicle window according to claim 9, wherein the dielectric barrier layer and the dielectric cover layer have a thickness of 10 nm to 50 nm.

11. The vehicle window according to claim 9, wherein the dielectric cover layer is based on silicon nitride.

12. A vehicle window, comprising at least one transparent glass pane and an IR-reflective coating on a surface of the at least one transparent glass pane,
   wherein the IR-reflective coating comprises n metallic layers and (n+1) dielectric layer modules, wherein the dielectric layer modules are implemented as dielectric layers or layer sequences and wherein the (n+1) dielectric layer modules and the n metallic layers are arranged alternatingly such that each metallic layer is arranged between two dielectric layer modules, wherein n is a natural number greater than or equal to 1,
   wherein each metallic layer is implemented as a discontinuous layer of metal nanocrystals, which has regions that are occupied by metal nanocrystals and regions that are not occupied by nanocrystals,
   wherein an uppermost dielectric layer module of the (n+1) dielectric layer modules has a dielectric anti-reflection layer with a refractive index of at most 1.7, and wherein the number n is 2 and the at least one transparent glass pane is made of clear glass.

13. The vehicle window according to claim 1, wherein the IR-reflective coating is in direct contact with surroundings of the vehicle window.

14. The vehicle window according to claim 1, wherein the metal nanocrystals are silver, gold, aluminum, or copper nanocrystals.

15. The vehicle window according to claim 1, wherein the number n is 1 and the at least one transparent glass pane is made of tinted or colored glass.

16. The vehicle window according to claim 1, wherein the dielectric cover layer is in direct contact with the dielectric anti-reflection layer.

17. The vehicle window according to claim 1, wherein the refractive index is at most 1.55.

18. A method comprising providing a vehicle window according to claim 1 as a windowpane of a vehicle of locomotion on land, on water, or in the air.

19. The method according to claim 18, wherein the windowpane is a windshield, a side window, a rear window, or a roof panel.

20. The vehicle window according to claim 8, wherein the dielectric barrier layer is based on silicon nitride.

21. A method for producing a vehicle window, comprising:
   providing a transparent glass pane, and
   applying an IR-reflective coating to a surface of the transparent glass pane, which coating comprises n metallic layers and (n+1) dielectric layer modules, wherein the (n+1) dielectric layer modules are dielectric layers or layer sequences, and wherein the (n+1) dielectric layer modules and the n metallic layers are arranged alternatingly such that each metallic layer is arranged between dielectric layer modules, wherein n is a natural number greater than or equal to 1,
   wherein each metallic layer is implemented as a discontinuous layer of metal nanocrystals, which has regions that are occupied by metal nanocrystals and regions that are not occupied by nanocrystals, and wherein an uppermost dielectric layer module of the (n+1) dielectric layer modules has a dielectric anti-reflection layer with a refractive index of at most 1.7 and a dielectric cover layer above the dielectric anti-reflection layer, the dielectric cover layer forming an outermost layer of the IR-reflective coating.

22. The method according to claim 21, wherein the n metallic layers and the (n+1) dielectric layer modules are deposited by means of magnetron-enhanced cathodic sputtering.

* * * * *